US012753837B2

(12) United States Patent

Liu et al.

(10) Patent No.: US 12,753,837 B2
(45) Date of Patent: Oct. 6, 2026

(54) SEALING DEVICE

(71) Applicant: Schaeffler Technologies AG & Co. KG, Herzogenaurach (DE)

(72) Inventors: Xin Liu, Shanghai (CN); Lijuan Wu, Suzhou (CN); Chunliang Huang, Suzhou (CN); Yu Tang, Shanghai (CN); Xu Zhao, Shanghai (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/705,027

(22) PCT Filed: Sep. 13, 2022

(86) PCT No.: PCT/CN2022/118541
§ 371 (c)(1),
(2) Date: Apr. 26, 2024

(87) PCT Pub. No.: WO2023/071570
PCT Pub. Date: May 4, 2023

(65) Prior Publication Data

US 2024/0418265 A1 Dec. 19, 2024

(30) Foreign Application Priority Data

Oct. 26, 2021 (CN) ......................... 202111251914.1

(51) Int. Cl.

| | |
|---|---|
| ***F16J 15/32*** | (2016.01) |
| ***F16J 15/3208*** | (2016.01) |
| ***F16J 15/3272*** | (2016.01) |

(52) U.S. Cl.
CPC ....... *F16J 15/3208* (2013.01); *F16J 15/3272* (2013.01)

(58) Field of Classification Search
CPC .. F16J 15/3204; F16J 15/3208; F16J 15/3212; F16J 15/3272
See application file for complete search history.

(56) References Cited

U.S. PATENT DOCUMENTS

| | | | | |
|---|---|---|---|---|
| 5,695,201 | A * | 12/1997 | Wheeler | F16J 15/3236 277/944 |
| 5,836,700 | A | 11/1998 | Wilkie, Jr. et al. | |
| 2002/0047242 | A1 | 4/2002 | Watanabe et al. | |
| 2003/0062689 | A1 | 4/2003 | Olsson et al. | |
| 2014/0125014 | A1* | 5/2014 | Panchal | F16F 1/187 277/550 |
| 2016/0153563 | A1* | 6/2016 | Bissoon | F16J 15/3204 29/428 |

(Continued)

FOREIGN PATENT DOCUMENTS

| | | | | |
|---|---|---|---|---|
| CN | 105065464 A | | 11/2015 | |
| GB | 799549 A | * | 8/1958 | F16J 15/54 |

(Continued)

*Primary Examiner* — Christine M Mills
*Assistant Examiner* — L. Susmitha Koneru
(74) *Attorney, Agent, or Firm* — Volpe Koenig

(57) ABSTRACT

A sealing device. The sealing device includes an elastic sealing body. The clastic sealing body has a first end and a second end, the elastic sealing body extends from the first end to the second end, and the first end and the second end can be detachably joined together to form a closed loop. The sealing device is easy to mount.

18 Claims, 3 Drawing Sheets

(56) References Cited

U.S. PATENT DOCUMENTS

| | | | | |
|---|---|---|---|---|
| 2018/0023708 | A1* | 1/2018 | Pfandl | F16J 15/3268 277/382 |
| 2018/0266562 | A1* | 9/2018 | Balsells | F16J 15/328 |
| 2020/0408303 | A1 | 12/2020 | Gruhler et al. | |
| 2022/0282792 | A1* | 9/2022 | Zhao | F16J 15/3252 |

FOREIGN PATENT DOCUMENTS

| | | | |
|---|---|---|---|
| JP | 2005083414 | A | 3/2005 |
| WO | 2019058090 | A1 | 3/2019 |

* cited by examiner

SEALING DEVICE

CROSS-REFERENCE TO RELATED APPLICATIONS

This application is the U.S. National Phase of PCT Appln. No. PCT/CN2022/118541, filed Sep. 13, 2022, which claims priority to Chinese Patent Application No. 202111251914.1, filed Oct. 26, 2021, the entire disclosures of which are incorporated by reference herein.

TECHNICAL FIELD

The present disclosure relates to the technical field of sealing. In particular, the present disclosure relates to a sealing device that is easy to mount.

BACKGROUND

At present, a spring-loaded rotating-shaft sealing device is usually used in a main shaft bearing of a wind turbine to prevent external pollutant intrusion and internal grease leakage. The rotating-shaft sealing device is generally an annular component formed by a fabric-reinforced frame, an elastic sealing body and a plurality of leaf springs combined through a vulcanization process. The fabric-reinforced frame is in interference contact with an inner ring or an outer ring of the bearing to achieve more flexible mounting. The leaf springs evenly distributed along the circumference can apply a uniform radial force to a sealing lip, so that the sealing lip has a better sealing performance and can withstand a larger eccentric force.

Generally, the sealing device for the wind turbine has a very large diameter, so a larger mold is required for manufacturing. Meanwhile, the equipment for implementing the vulcanization process also has a large size, which results in higher processing costs and processing difficulties. In addition, in a maintenance process, the bearing cannot be disassembled from the wind turbine, so it is difficult to mount a complete sealing ring. Therefore, a sealing device that is easy to mount is needed to meet subsequent demands of the market.

SUMMARY

Therefore, the technical problem to be solved by the present disclosure is to provide a sealing device that is easy to mount.

The above-mentioned technical problem is solved by a sealing device according to the present disclosure. The sealing device comprises an elastic sealing body, wherein the elastic sealing body has a first end and a second end, the elastic sealing body extends from the first end to the second end, and the first end and the second end can be detachably joined together to form a closed loop. Since the two ends of the elastic sealing body can be joined to form an annular sealing ring or detached to break the loop, the sealing device can be conveniently mounted on or disassembled from, for example, the bearing.

According to a preferred embodiment, in a joined state, the first end and the second end can be connected together in a form-fitting manner, thereby limiting relative movements between the first end and the second end along a circumferential direction and a radial direction. By the form-fitting manner, it is possible not only to conveniently achieve a detachable connection of the two ends, but also to effectively prevent accidental detachment in the joined state.

Furthermore, other detachable connection methods can also be used, for example, a reusable binding agent or the like is used for connection.

According to another preferred embodiment, the sealing device may further comprise a first clamp fixed at the first end and a second clamp fixed at the second end, and the first clamp can be joined with the second clamp to connect the first end and the second end together. The first clamp and the second clamp, for example, may be formed of a hard material such as metal, and the structural strength of the two ends of the elastic sealing body can thus be improved to allow easy connection and support of the elastic sealing body.

According to another preferred embodiment, the first clamp may have a shape recessed along an extension direction of the elastic sealing body, and the second clamp may have a shape complementary to the first clamp and projecting along the extension direction of the elastic sealing body. In this case, the second clamp can be inserted and clamped in the first clamp, thereby achieving a stable connection of the two ends of the elastic sealing body.

According to another preferred embodiment, a size of a recessed portion of the first clamp along a radial direction of the closed loop may gradually increase toward a recess direction. Correspondingly, a size of a projecting portion of the complementary second clamp along the radial direction gradually increases toward a projecting direction, so a relative movement between the first end and the second end along the circumferential direction can be effectively limited in an inserted state, thereby preventing the two ends from being detached.

According to another preferred embodiment, the recessed portion of the first clamp can penetrate along an axial direction of the closed loop and have a uniform cross-section, so that the projecting portion of the second clamp can be inserted into the recessed portion of the first clamp along the axial direction of the closed loop. Therefore, the two ends can be connected and detached more easily.

According to another preferred embodiment, the sealing device may further comprise a plurality of springs fixed on the elastic sealing body, and the plurality of springs may be spaced and distributed along the extension direction of the elastic sealing body. Therefore, the spring will not hinder the elastic sealing body from stretching or bending through elastic deformation, thereby facilitating the mounting and disassembling of the sealing device. Preferably, the plurality of springs may be equidistantly spaced and distributed along the extension direction of the elastic sealing body, thereby ensuring a uniform pre-tightening force along the circumferential direction.

According to another preferred embodiment, the elastic sealing body may comprise a sealing lip, and when the elastic sealing body forms a closed loop in the joined state, the plurality of springs radially load the sealing lip toward the same side. For example, the sealing lip may be located at a radial outer side and all the springs load the sealing lip toward the radial outer side, such that the sealing lip abuts against an outer ring of a bearing; alternatively, the sealing lip may be located at a radial inner side and all the springs load the sealing lip toward the radial inner side, so that the sealing lip abuts against an inner ring of the bearing.

According to another preferred embodiment, the sealing device may further comprise a frame fixed on the elastic sealing body, wherein when the elastic sealing body forms the closed loop in the joined state, the frame is located at one side of the elastic sealing body opposite to the sealing lip along the radial direction. The frame can be, for example, a fabric-reinforced frame, which can deform along with the elastic sealing body when the sealing device is mounted and disassembled, and has a considerable strength to support the elastic sealing body in a mounted state.

BRIEF DESCRIPTION OF THE DRAWINGS

The present disclosure is further described below in conjunction with the accompanying drawings. The same reference numerals in the drawings will be used to refer to elements with the same functions. Therein.

DETAILED DESCRIPTION

The detailed description of a sealing device according to the present disclosure will be described below in conjunction with the accompanying drawings. The following detailed description and drawings are intended to exemplarily illustrate the principle of the present disclosure. The present disclosure is not limited to the described preferred embodiments, and the scope of protection of the present disclosure is defined by the claims.

According to an embodiment, a sealing device easy to mount is provided. The sealing device can, for example, be applied in a bearing of a wind turbine. Such bearing usually has a larger size.

Figure 1:
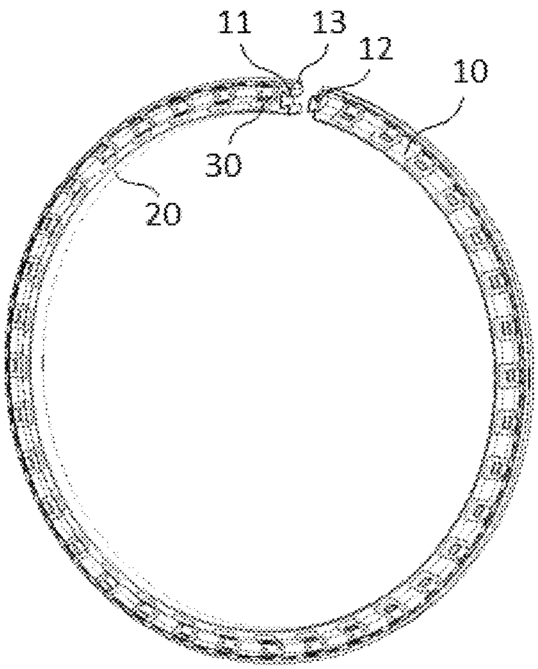
FIG. 1 shows a perspective view of a sealing device according to an exemplary embodiment according to the present disclosure.
Figure 2:
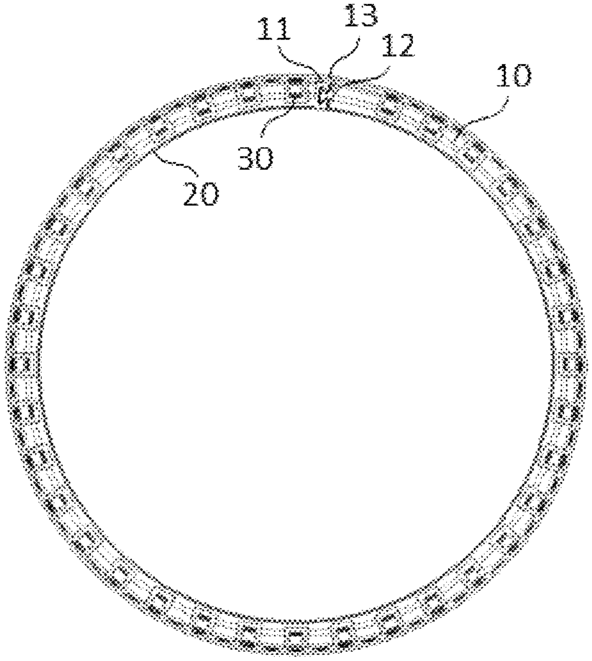
FIG. 2 shows a front view of a sealing device according to an exemplary embodiment.

FIGS. 1 and 2 show an exemplary embodiment of the sealing device. The sealing device comprises an elastic sealing body 10, a frame 20, and springs 30. The elastic sealing body 10 is made of, for example, an elastic material such as rubber, and thus is capable of elastic deformation. The elastic sealing body 10 has an elongated structure and two end portions opposite to each other along an extension direction of the elongated structure, namely, a first end 11 and a second end 12. The first end 11 and the second end 12 can be joined (FIG. 2) and detached (FIG. 1). As shown in FIG. 2, when the two ends are joined together, the elastic sealing body 10 forms a closed loop.

The elastic sealing body 10 comprises one or more sheet-shaped sealing lips 13 extending outward. The sealing lip 13 extends across the entire elastic sealing body 10 along an extension direction of the elastic sealing body 10. When the two ends of the elastic sealing body 10 are connected together to form a closed loop, the sealing lip 13 also correspondingly forms a closed loop.

The frame 20 is fixed at one side of the elastic sealing body 10, for example, by vulcanization, etc. When the elastic sealing body 10 forms the closed loop, the frame 20 and the sealing lip 13 are opposite to each other along a radial direction of the closed loop. In the present embodiment, the sealing device is mounted on an inner ring of a bearing, wherein the frame 20 is located at a radial inner side of the closed loop, and the sealing lip 13 is located at a radial outer side of the closed loop. However, the sealing device can also be mounted on an outer ring of the bearing, and the radial positions of the frame 20 and the sealing lip 13 are correspondingly reversely arranged. The frame 20, which can be a fabric-reinforced frame formed by gluing and compressing multiple layers of canvas fabrics, has good strength and wear resistance and meanwhile has certain flexibility, so the frame 20 can not only support the elastic sealing body 10, but also elastically deform along with the elastic sealing body during mounting or disassembling.

Figure 3:
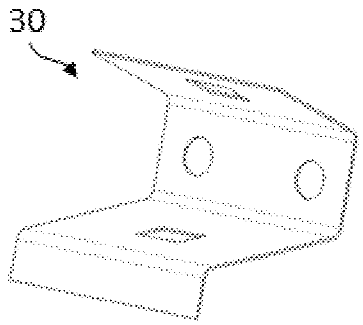
FIG. 3 shows a perspective view of a spring of a sealing device according to an exemplary embodiment.
Figure 4:
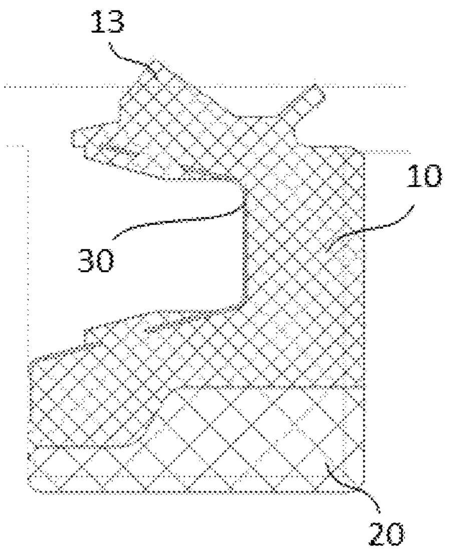
FIG. 4 shows a sectional view of a sealing device according to an exemplary embodiment.

The sealing device comprises a plurality of springs 30 fixed on the elastic sealing body 10. These springs 30 are spaced and distributed along the extension direction of the elastic sealing body 10, and in particular, equidistantly spaced and distributed along the extension direction of the elastic sealing body 10. FIG. 3 shows a perspective view of the spring 30, and FIG. 4 shows a sectional view of the sealing device. As shown in FIG. 3, the spring 30 is a bent leaf spring. As shown in FIG. 4, all the springs 30 are arranged at one side close to the sealing lip 13, so as to load the sealing lip 13 toward the same side. When the two ends of the elastic sealing body 10 are connected to form the closed loop, all the springs 30 radially load the sealing lip 13 toward one side opposite to the frame 20, such that the sealing lip 13 closely abuts against the outer ring or the inner ring of the bearing (in the present embodiment, the outer ring).

Figure 5:
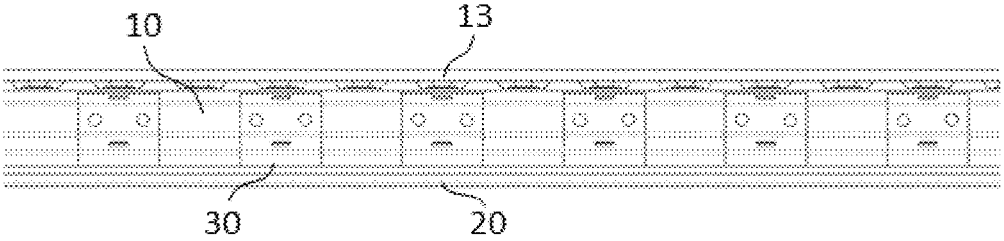
FIG. 5 shows an expanded view of a sealing device according to an exemplary embodiment.

Since the springs 30 are spaced and distributed, the elastic sealing body 10 having the springs 30 mounted can still bend or stretch relative to the extension direction. As shown in FIG. 5, when the two ends of the elastic sealing body 10 are detached, the elastic sealing body 10 can be expanded into a linear structure. During manufacturing, the elastic sealing body 10 and the frame 20 with very long length can be conveniently produced, and the springs 30 can be equidistantly arranged in the elastic sealing body 10, and the sealing devices with different lengths can then be cut as needed.

Figure 6:
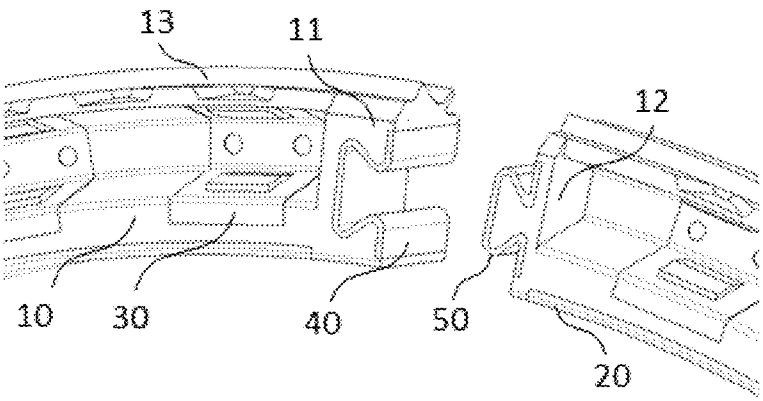
FIG. 6 shows a schematic diagram for a detached state of end portions of a sealing device according to an exemplary embodiment.
Figure 7:
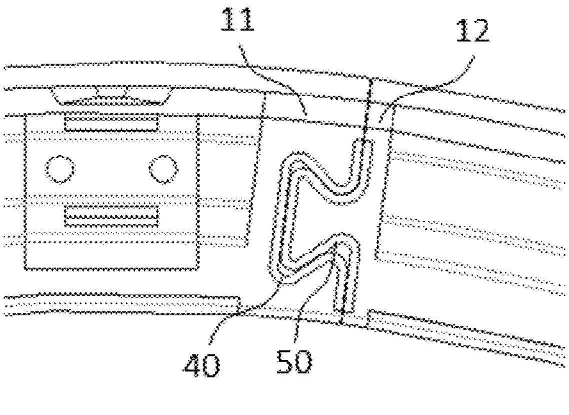
FIG. 7 shows a schematic diagram for a joined state of end portions of a sealing device according to an exemplary embodiment.

FIGS. 6 and 7 show schematic diagrams for the detached and joined states of the end portions of the sealing device, respectively. In an exemplary embodiment, the two ends of the elastic sealing body 10 can be joined together in a form-fitting manner. The form fitting of the first end 11 and the second end 12 can limit relative movements between the two joined ends along a circumferential direction and a radial direction. Such form fitting can be not only a direct fitting of the end portions of the elastic sealing body 10 itself, but also an indirect fitting by means of an additional component on the end portion.

In order to improve the strength of the end portions of the elastic sealing body 10 to facilitate connection and disassembly, the sealing device may further comprise two mutually-matched clamps fixed on the two ends. The first clamp 40 is fixed on the first end 11 and the second clamp 50 is fixed on the second end 12. The first clamp 40 and the second clamp 50 cover at least a portion of an end surface of a corresponding end portion, respectively. The two clamps, for example, can be made of a sheet metal. The two clamps can be joined together through form fitting, so as to connect the two end portions. In the present embodiment, the first clamp 40 has a shape recessed along the extension direction of the elastic sealing body 10, and the second clamp 50 has a shape substantially complementary to the first clamp 40 and projecting along the extension direction of the elastic sealing body 10. A projecting portion of the second clamp 50 can be inserted into a recessed portion of the first clamp 40. The two clamps may have certain elasticity, so that the first clamp 40 can clamp the second clamp 50.

Preferably, a size of the recessed portion of the first clamp 40 along the radial direction of the closed loop can gradually increase toward a recess direction, and correspondingly, a size of the projecting portion of the second clamp 50 along the radial direction of the closed loop can also gradually increase towards a projecting direction. For example, as shown in FIGS. 6 and 7, when viewed in the plane of the closed loop, the recessed portion and the projecting portion may have a generally trapezoidal profile, respectively. Such configuration enables the first end 11 and the second end 12 not to move relative to each other along the radial direction or the circumferential direction when the second clamp 50 is inserted into the first clamp 40. Furthermore, preferably, the recessed portion of the first clamp 40 can be formed to penetrate along an axial direction of the closed loop and have a uniform cross-section, that is, the recessed portion is formed to be in the shape of a right prism or a right cylinder (in the present embodiment, a right square prism) penetrating the first end 11 along the axial direction of the closed loop. Correspondingly, the projecting portion is also formed to be in the shape of a right prism or a right cylinder extending between two sides of the second end 12 along the axial direction of the closed loop. In this case, the projecting portion of the second clamp 50 can be inserted into the recessed portion of the first clamp 40 or detached from the recessed portion of the first clamp 40 along the axial direction of the closed loop.

The cross-sectional shapes of the first end 11 and the second end 12 correspond to each other, so that they can be completely joined during connection. In order to easily mount the two clamps, the cross-sections of the portions of the two end portions except the sealing lip 13 can be formed to be substantially rectangular, thereby having a larger cross-sectional area than the section between the end portions of the elastic sealing body 10. The two clamps can be fixed on the corresponding end portions of the elastic sealing body 10 by, for example, vulcanization, etc. When the two end portions are joined by the clamps, the end surfaces of the sealing lips 13 of the two end portions can directly contact each other and match completely, thereby forming a complete loop.

When the two ends of the sealing device are detached, the sealing device can be conveniently mounted on or disassembled from the inner ring or the outer ring of the bearing. Upon completion of mounting, the two ends of the sealing device can be stably connected together to form an annular sealing ring. For application scenarios such as a rotor shaft of a wind turbine, a radial plane of the sealing device is arranged vertically, and in this case, a connection portion of the two ends can be arranged at the apex, thereby effectively reducing the risk of leakage. Even in the case of a horizontal arrangement, a good sealing effect can be also ensured due to the tight engagement of the clamps. Such sealing device is not only easy to mount and disassemble, but also has a simple processing technology, which is beneficial to reducing costs.

Although possible embodiments have been described illustratively in the above description, it should be understood that there are still a large number of embodiment variations through combinations of all known technical features and embodiments as well as those that are readily apparent to those skilled in the art. In addition, it should be further understood that the exemplary embodiments are just examples and shall not in any way limit the scope of protection, application and construction of embodiments in accord with the disclosure. The foregoing description is more intended to provide those skilled in the art with a technical guide for converting at least one exemplary embodiment, in which various changes, especially changes in the functions and structures of the components, can be made as long as they do not depart from the scope of protection of the claims.

LIST OF REFERENCE NUMERALS

10 Elastic sealing body;
11 First end;
12 Second end;
13 Sealing lip;
20 Frame;
30 Spring;
40 First clamp;
50 Second clamp.

The invention claimed is:

1. A sealing device, comprising: an elastic sealing body having a first end and a second end, the elastic sealing body extends from the first end to the second end, and the first end and the second end are detachably joinable together to form a closed loop; and a first clamp fixed at the first end and a second clamp fixed at the second end, the first clamp is joinable with the second clamp to connect the first end to the second end;

wherein the first clamp comprises a female connector recessed along an extension direction of the elastic sealing body, and the second clamp comprises a male connector shaped complementary to the female connector and projecting along the extension direction of the elastic sealing body, and a length of the female connector penetrates from a first axial end face to a second axial end face of the elastic sealing body along a direction parallel to an axial direction of the closed, and the female connector has a uniform cross-section so that the male connector of the second clamp is insertable into the female connector of the first clamp along the axial direction of the closed loop.

2. The sealing device according to claim 1, wherein, in a joined state, the first end and the second end are connected together in a form-fitting manner, thereby limiting relative movements between the first end and the second end along a circumferential direction and a radial direction.

3. The sealing device according to claim 1, wherein a size of the female connector of the first clamp along a radial direction of the closed loop gradually increases toward a recess direction.

4. The sealing device according to claim 1, further comprising a plurality of springs fixed on the elastic sealing body, and the plurality of springs are spaced and distributed along the extension direction of the elastic sealing body.

5. The sealing device according to claim 4, wherein the plurality of springs are equidistantly spaced and distributed along the extension direction of the elastic sealing body.

6. The sealing device according to claim 5, wherein the elastic sealing body comprises a sealing lip, and when the elastic sealing body forms the closed loop in a joined state, the plurality of springs radially load the sealing lip toward a same side.

7. The sealing device according to claim 6, further comprising a frame fixed on the elastic sealing body, and when the elastic sealing body forms the closed loop in the joined state, the frame is located at one side of the elastic sealing body opposite to the sealing lip along the radial direction.

8. A sealing device, comprising:

an elastic sealing body having a first end and a second end, the elastic sealing body extends from the first end to the second end, and the first end and the second end are detachably joinable together to form a closed loop that limits relative movement between the first and second ends in a circumferential direction;

a plurality of springs fixed on the elastic sealing body, the plurality of springs are spaced and distributed along an extension direction of the elastic sealing body;

wherein the elastic sealing body comprises a sealing lip disposed on a radially outermost point or edge of the elastic sealing body and a frame that is coupled to the elastic sealing body on a radially inner surface of the elastic sealing body, such that when the elastic sealing body forms the closed loop in a joined state, the frame is located radially opposite to the sealing lip along a radial direction, and when the elastic sealing body is in a detached state the frame remains coupled to the elastic sealing body.

9. The sealing device according to claim 8, wherein the sealing device further comprises a first clamp fixed at the first end and a second clamp fixed at the second end, and the first clamp is joinable with the second clamp to connect the first end and the second end together.

10. The sealing device according to claim 9, wherein the first clamp includes a recess, and the second clamp has a complementary projection to the first clamp.

11. The sealing device according to claim 10, wherein a size of the recess along the radial direction of the closed loop gradually increases in an inward direction of the recess.

12. The sealing device according to claim 11, wherein the recess extends in an axial direction of the closed loop with a uniform cross-section, so that the projection is insertable into the recess along the axial direction of the closed loop.

13. The sealing device according to claim 8, wherein the plurality of springs are equidistantly spaced and distributed along the extension direction of the elastic sealing body.

14. The sealing device according to claim 8, wherein when the elastic sealing body forms the closed loop in the joined state, the plurality of springs radially load the sealing lip toward a same side.

15. The sealing device according to claim 8, wherein the frame is fixed on the elastic sealing body by vulcanization.

16. The sealing device according to claim 8, wherein the frame comprises a fabric-reinforced frame.

17. The sealing device according to claim 1, wherein the first clamp and the second clamp are constructed from a metallic material.

18. The sealing device according to claim 17, wherein the first clamp and the second clamp are configured to increase a structural strength of the first end and the second end of the elastic sealing body.

* * * * *